(12) United States Patent
Tan et al.

(10) Patent No.: US 8,732,172 B2
(45) Date of Patent: May 20, 2014

(54) SHAPE CLASSIFICATION METHOD BASED ON THE TOPOLOGICAL PERCEPTUAL ORGANIZATION THEORY

(75) Inventors: Tieniu Tan, Beijing (CN); Kaiqi Huang, Beijing (CN); Yongzhen Huang, Beijing (CN)

(73) Assignee: Institute of Automation, Chinese Academy of Sciences, Beijing (CN)

( * ) Notice: Subject to any disclaimer, the term of this patent is extended or adjusted under 35 U.S.C. 154(b) by 0 days.

(21) Appl. No.: 13/142,650

(22) PCT Filed: May 13, 2010

(86) PCT No.: PCT/CN2010/000684
§ 371 (c)(1),
(2), (4) Date: Mar. 9, 2012

(87) PCT Pub. No.: WO2011/140679
PCT Pub. Date: Nov. 17, 2011

(65) Prior Publication Data
US 2013/0046762 A1 Feb. 21, 2013

(51) Int. Cl.
*G06F 7/00* (2006.01)
*G06F 17/30* (2006.01)
(52) U.S. Cl.
USPC .......................................................... 707/737
(58) Field of Classification Search
None
See application file for complete search history.

(56) References Cited

U.S. PATENT DOCUMENTS 6,323,863 B1 * 11/2001 Shinagawa et al. ........... 345/441

FOREIGN PATENT DOCUMENTS

| CN | 101110100 A | 1/2008 |
|---|---|---|
| CN | 101276418 A | 10/2008 |
| CN | 101702197 A | 5/2010 |
| WO | 2004086503 A1 | 10/2004 |
| WO | 2010027476 A1 | 3/2010 |

OTHER PUBLICATIONS

International Search Report and Written Opinion for PCT International Patent Application No. PCT/CN2010/000684, mailed Feb. 17, 2011.

* cited by examiner

*Primary Examiner* — Uyen Le
(74) *Attorney, Agent, or Firm* — Pillsbury Winthrop Shaw Pittman LLP

(57) ABSTRACT

A shape classification method based on the topological perceptual organization (TPO) theory, comprising steps of: extracting boundary points of shapes (S1); constructing topological space and computing the representation of extracted boundary points (S2); extracting global features of shapes from the representation of boundary points in topological space (S3); extracting local features of shapes from the representation of boundary points in Euclidean space (S4); combining global features and local features through adjusting the weight of local features according to the performance of global features (S5); classifying shapes using the combination of global features and local features (S6). The invention is applicable for intelligent video surveillance, e.g., objects classification and scene understanding. The invention can also be used for the automatic driving system wherein robust recognition of traffic signs plays an important role in enhancing the intelligence of the system.

7 Claims, 5 Drawing Sheets

(a)  (b)  (c)  (d)

Precision  35.5%  38.5%  41.1%  59.0%  62.2%  64.5%

SHAPE CLASSIFICATION METHOD BASED ON THE TOPOLOGICAL PERCEPTUAL ORGANIZATION THEORY

CROSS REFERENCE TO RELATED APPLICATIONS

This is the U.S. National Phase of PCT/CN2010/000684, filed May 13, 2010, the entire contents of which is incorporated herein in its entirety by reference.

FIELD OF THE INVENTION

The invention is related to a pattern recognition, especially to object recognition based on visual psychology.

BACKGROUND OF THE INVENTION

Shape recognition is a key technology in intelligent video surveillance and the automatic driving system. It can be used to classify interesting objects in intelligent video surveillance and to recognize traffic signs in the automatic driving system.

Most of the shape classification methods focus on local features of shapes. These methods work well only in the case of using discriminative local features. In fact, global features play an important role in shape classification. However most of current shape classification algorithms ignore the importance of global features. Meanwhile, some kinds of global features, e.g., attention-based ones, are difficult to be incorporated into local features based shape classification. Fusion of global features and local features is a key technology in shape classification. However, most fusion strategies simply use the concatenation of local and global representation. Usually these strategies perform not well and lack of cognitive motivations.

It's worth noting that there is related research about global features and local features in the field of cognitive visual psychology. On the one hand, early feature-analysis theories hold that visual perception is a local-to-global process. Marr's computational vision model claims that the primitives of visual information are simple components of forms and their local geometric properties. Treisman's feature integration theory (A. Treisman and G. Gelade, "A feature-integration theory of attention," Cognitive Psychology, vol. 12, no. 1, pp. 97-136, 1980.) assumes that primary visual features are firstly represented with independent "feature maps" and later recombined together to form objects. Biederman's recognition-by-components (RBC) theory (I. Biederman, "Recognition-by-components: a theory of human image understanding," Psychological Review, vol. 94, no. 2, pp. 115-147, 1987.) considers that object recognition originates from breaking object into components of basic shapes. On the other hand, early holistic theory, e.g., Gestalt psychology of perceptual organization http://en.wikipedia.org/wiki/Gestalt psychology.) considers that cognitive process is a global-to-local process. Along this direction, Chen et al. proposed a topological perceptual organization (TPO) theory which makes a great breakthrough in cognitive visual psychology. It develops the Gestalt psychology and uses visual psychology experiments to well support that: 1) global perception is prior to local perception; 2) global properties can be described by topological invariance; and 3) topological invariance is superior to other properties, e.g. affine invariance and scale invariance. In the following, we analyze two interesting experiments.

FIG. 9 illustrates the experiment of testing bees' ability of shape classification. In this experiment (L. Chen, S. W. Zhang, and M. Srinivasan, "Global perception in small brain: Topological pattern recognition in honeybees," Proceedings of the National Academy of Science, vol. 100, pp. 6884-6889, 2003.), Chen et al. firstly trained bees to find the shape "O" (by a reward of sugar water). Then, the sugar water was removed and bees' ability to shape recognition was tested again. Results show that bees would choose the diamond shape which is similar to shape "O". This experiment demonstrates that, for creatures with a low level visual system, topological invariance can still play an important role in shape classification.

In another famous experiment shown in FIG. 10, Chen et al. demonstrated that topological invariance is also the most critical for human visual perception (Y. Zhuo, T. G. Zhou, H. Y. Rao, J. J. Wang, M. Meng, M. Chen, C. Zhou, and L. Chen, "Contributions of the visual ventral pathway to long-range apparent motion," Science, vol. 299, pp. 417-420, 2003.). In this experiment, subjects were requested to judge whether two images are different or identical after very short presentation (5 ms) of a pair of images. The high correct response indicates that two shapes are easily distinguished, i.e., topologically different. The experimental results are consistent with their prediction that it is hard for subjects to differentiate topologically equivalent structures.

Although TPO theory makes great breakthrough in the field of cognitive visual psychology, it is built on experiments and lacks of mathematic descriptions and a computational model.

SUMMARY OF THE INVENTION

This invention aims to provide a method to extract global features from shapes and a fusion strategy of combining global features and local features for shape representation.

For this goal, the shape classification method based on the topological perceptual organization theory is proposed, comprising of six steps:

Extracting boundary points of shapes (S1);

Constructing topological space and computing the representation of extracted boundary points (S2);

Extracting global features of shapes from the representation of boundary points in topological space (S3);

Extracting local feature of shapes from the representation of boundary points in Euclidean space (S4);

Combining global features and local features through adjusting the weight of local features according to the performance of global features (S5);

Classifying shapes using the combination of global features and local features (S6).

The invention is applicable to intelligent video surveillance, e.g., objects classification, scene understanding. The invention can also be used for the automatic driving system wherein robust recognition of traffic signs plays an important role in enhancing the intelligence of the system.

DETAILED DESCRIPTION OF THE PREFERRED EMBODIMENT

Next we explain the details of the invention. Note that the description of the details is provided as an aid to understand the invention. It is not a restriction to the invention.

Figure 1:
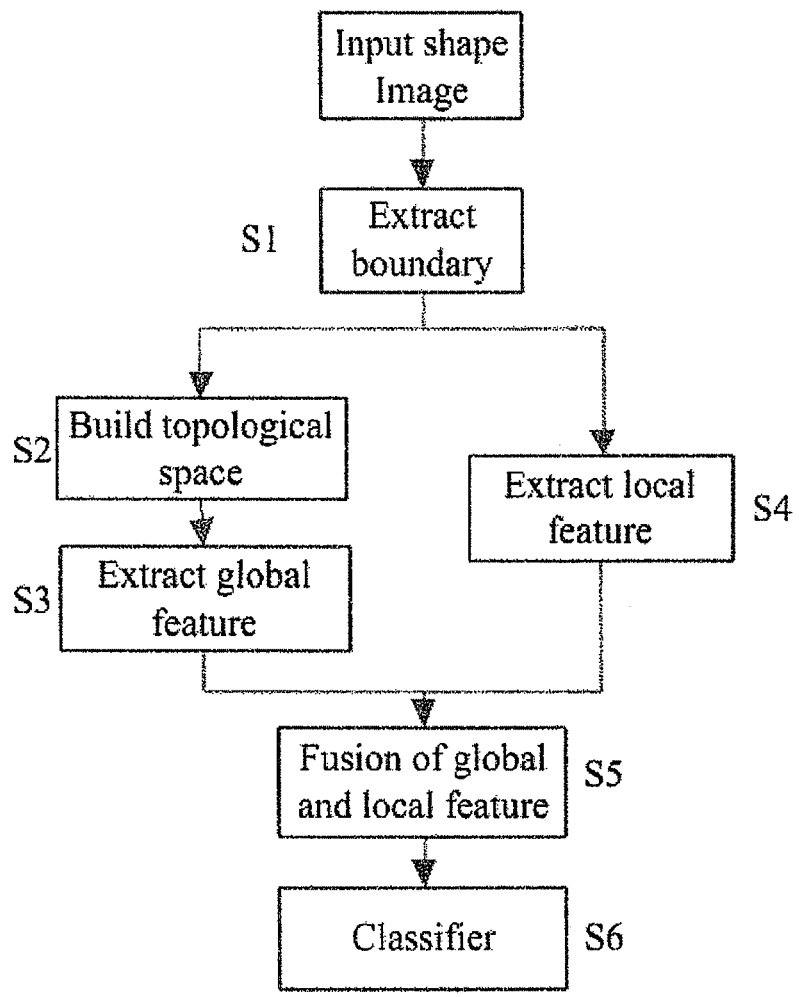
FIG. 1 is a flow diagram of the shape classification framework based on the topological perceptual organization theory.

The invention implements an object recognition system based on the topological perceptual organization theory. FIG. 1 shows the flow diagram of the shape classification system based on the topological perceptual organization theory. Firstly we extract boundary points of shapes; then we construct topological space wherein the relations among boundary points are described by their geodesic distance; afterwards global features and local features are extracted and combined; finally the combined features are used for shape classification.

The following statements are details of the key steps involved in the invention by using figures as an illustration.

Step S1: Extract the boundary points of shape image. Canny edge detector is applied for boundary extraction.

Figure 2:
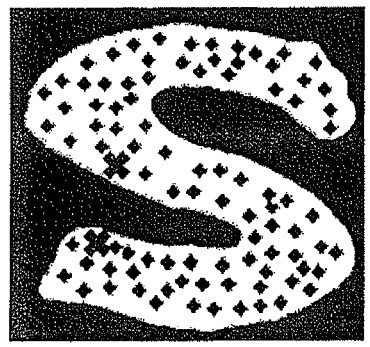
FIG. 2 is a diagram showing that the representation under Euclidean space is weak.

Step S2: Construct topological space and compute the representation of the boundary points in topological space. Compared with Euclidean space used in many computer vision algorithms, topological space not only has strong cognitive motivation but also provides reasonable explanation in the viewpoint of computer vision which is explained below:

Firstly, what the human visual system adopts is not Euclidean space. For instance, parallel straight lines can be considered as intersect lines by human eyes. Another example is shown in FIG. 2. Points marked with red crosses are very close in Euclidean space, but they are far away from each other when they are used to represent the shape "S". In fact, it is more reasonable that their distance is measured by geodesic distance.

Figure 3:
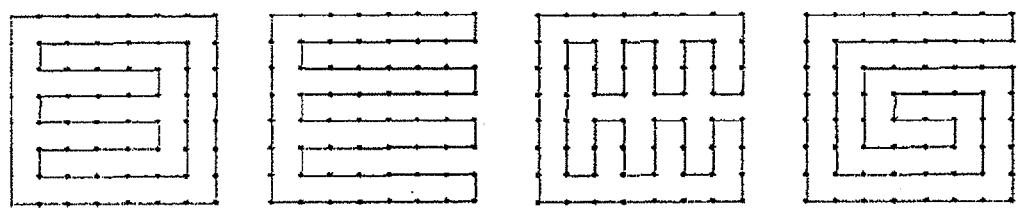
FIG. 3 is a diagram showing that geodesic distance is helpful to represent semantic meaning of a shape.

Secondly, Euclidean space may lead to the failure of some computer vision algorithms. Take FIG. 3 as an example. The black dots in four figures have exactly the same position in Euclidean space, while these four figures are different in the semantic level. This example shows that it's difficult to represent what human eyes represent using Euclidean space. The key problem is, as we have stated, what human visual system adopts is not Euclidean space.

The topological space is defined as:

$$d^* = G(d') \quad (1)$$

where G is geodesic distance operator and d' is defined as:

$$d'(i,j) = \begin{cases} d(i,j), & \text{if } d(i,j) < \xi \\ \infty, & \text{otherwise} \end{cases} \quad (2)$$

where ξ is the tolerance, d(i,j) denotes the Euclidean distance between i and j which are two primitives, e.g., two boundary points of a shape.

Figure 4:
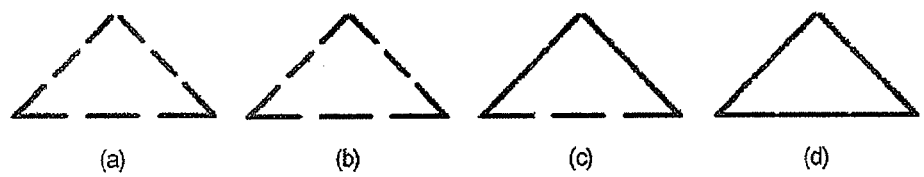
FIG. 4 is a diagram showing the role of the tolerance.

FIG. 4 shows the role of the tolerance. It analyzes how human eyes form the perception to triangles. Usually, human eyes would consider these four shapes in FIG. 4 as triangles. The reason is that there is a tolerance in the human visual system used to link the discrete points. The tolerance can be understood as the largest ignorable distance.

Step S3: Extract the representation of global features from boundary points in topological space. We adopt the ratio of d*(i,j) to d(i,j) as the vote to construct a frequency histogram which is used as the global feature of a shape. The histogram is defined as:

$$h(k) = \sum_{i=1}^{n} \sum_{j=i+1}^{n} \theta(i,j), \quad \text{if } L(k) \le \theta(i,j) < U(k) \quad (3)$$

$$\theta(i,j) = \frac{d^*(i,j)}{d(i,j)} \quad (4)$$

Where n is the number of boundary points of a shape, L(k) and U(k) are the lower bound and upper bound of the $k^{th}$ bin of the histogram.

Figure 5:
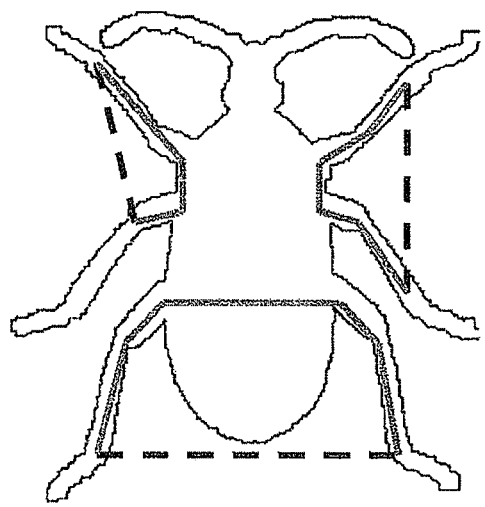
FIG. 5 is a diagram showing the procedure of extracting global features, wherein Green line denotes geodesic distance and red dashed line denotes Euclidean distance; we adopt the ratio between geodesic distance and Euclidean distance to extract global features.

FIG. 5 is a diagram wherein the ratio of geodesic distance to Euclidean distance is adopted as global features. It's worth noting that this is a very simple global feature extraction algorithm, which is equivalent to estimate the distribution of image pixels' intensity in Euclidean space. Adopting this relatively simple formulation of the global feature is to emphasize the importance of the topological space in shape classification.

Step S4: Extract the representation of local features of boundary points in Euclidean space. We adopt the SIFT algorithm to extract the local feature of shapes.

Step S5: Combine global features and local features and adjust the weight of local feature according to the matching score of shapes using global features. We firstly obtain the matching score by using global features (the reciprocal of the global distance between global features of two shapes). Then the matching score is used as the weight of matching by local features. The final distance between two shapes is defined as:

$$dis_{final} = dis_{global} + \alpha \times dis_{local}$$

Where $dis_{global}$ is the global histogram distance between two shapes indicating the degree of global matching, $dis_{local}$ is local histogram distance between two shapes indicating the degree of local matching and α is the weight of local feature which is proportional to $dis_{global}$.

Step S6: Classify shapes using the final distance of shapes. Following step S1-S5, we can obtain distance between any two shapes. Then we can adopt cluster algorithms, e.g., the K-Means algorithm, to obtain the final results of shape classification.

Embodiment

Figure 6:
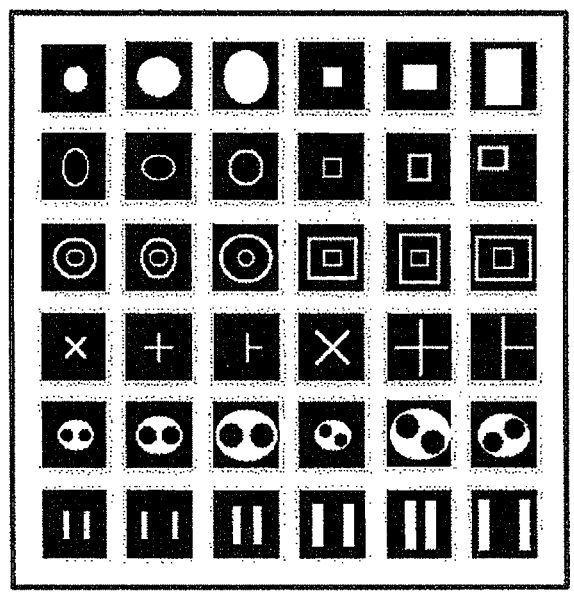
FIG. 6 is a diagram showing example images tested in our experiment, Based on these images, we construct a shape database.
Figure 7:
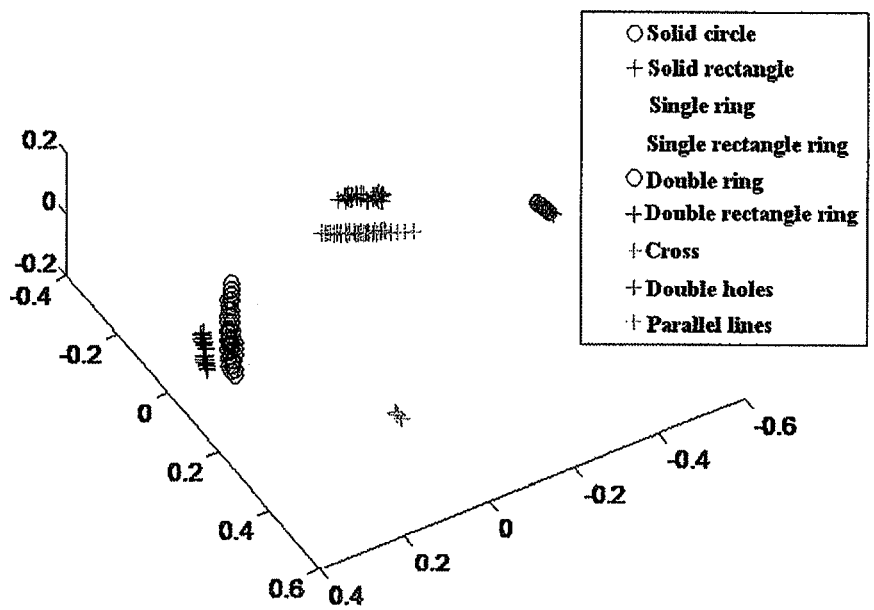
FIG. 7 is a diagram showing the performance of the method introduced in this invention on the constructed database. Points with the same color denote topologically equivalent shapes. It is obvious that they gather together by our method.
Figure 8:
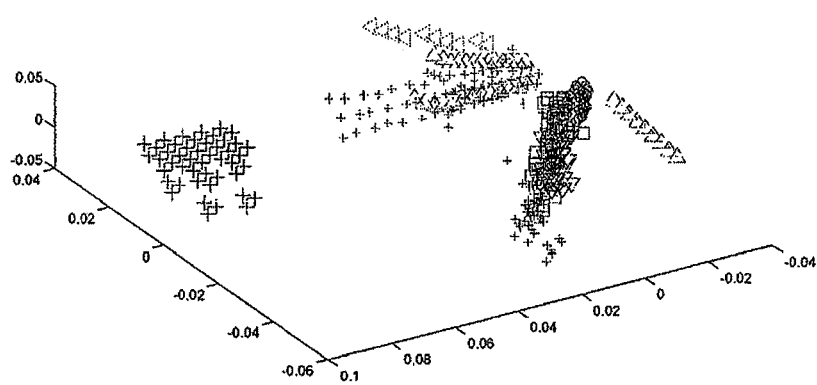
FIG. 8 is a diagram showing the performance of the SIFT algorithm on the constructed database. Points with the same color do not gather together and this result indicates that the SIFT algorithm is unable to effectively describe topological structures.
Figure 9:
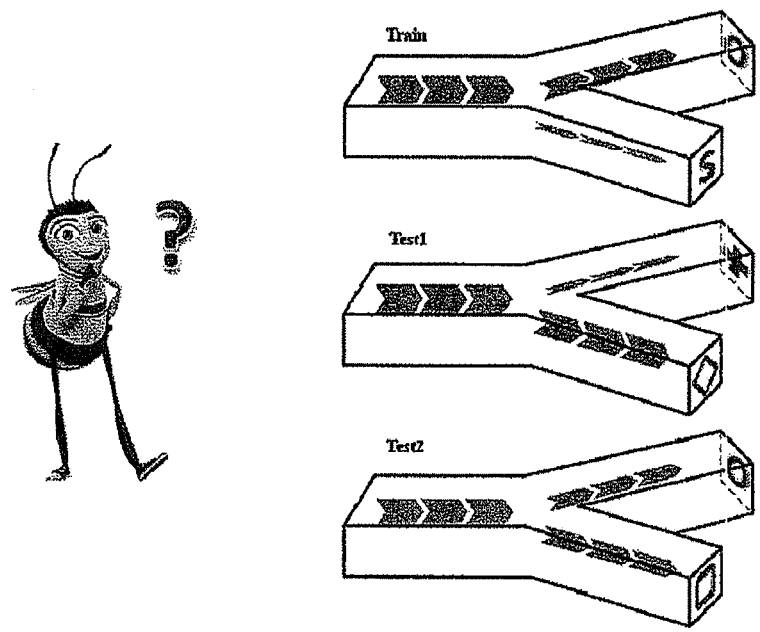
FIG. 9 is a diagram showing the experiment of testing bees' ability of shape recognition.
Figure 10:
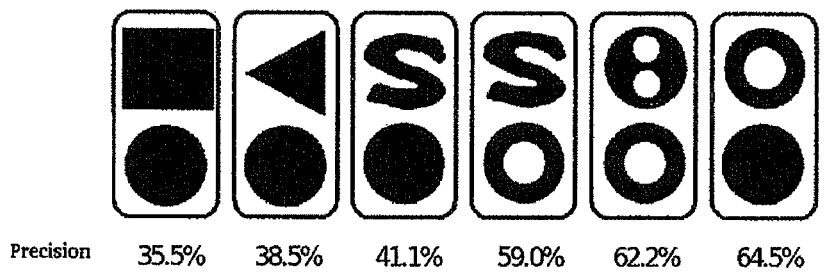
FIG. 10 is a diagram showing human's performance in differentiating different shapes.

In order to demonstrate the embodiment of the invention, we construct a database (see FIG. 6). Following the above mentioned steps, we test the performance of our proposed shape classification algorithm based on the topological perceptual organization theory. Steps are stated as follows:

Step S1: Extract boundary points from shapes using the Canny edge detector;

Step S2: Construct topological space using equation (1) and equation (2) and then compute the distance of the extracted boundary points in topological space;

Step S3: Extract the global feature from representation of boundary points in topological space using equation (3) and equation (4);

Step S4: Extract the SIFT feature from representation of boundary points in Euclidean space and adopt it as the local feature;

Step S5: Combine the global feature and the local feature using equation (5);

Step S6: Classify shapes using the final distance of shapes defined in equation (5). Afterwards, we adopt the K-Means algorithm to show the clustering results of shapes. FIG. 8 and FIG. 9 shows the comparison of our method and the SIFT algorithm on shape classification.

To draw a conclusion, the invention proposes a shape classification method based on the topological perceptual organization theory. The invention is easy to implement and robust to noises. The invention is applicable to intelligent video surveillance and automatic driving systems.

Although the invention has been described by the way of the example of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A shape classification method implemented by a computing device, comprising the steps of:
    S1: extracting boundary points of shapes;
    S2: constructing a topological space and computing a representation of the boundary points;
    S3: extracting global features of the shapes from the representation of the boundary points in the topological space;
    S4: extracting local features of the shapes from the representation of the boundary points in a Euclidean space;
    S5: combining the global features and the local features through adjusting weight values of the local features according to performance of the global features;
    S6: classifying the shapes using a combination of the global features and the local features.

2. The method of claim 1, wherein the topological space is defined as:

$$d^* = G(d')$$

where G is a geodesic distance operator for calculating a geodesic distance and d' is defined as:

$$d'(i,j) = \begin{cases} d(i,j), & \text{if } d(i,j) < \xi \\ \infty, & \text{otherwise} \end{cases}$$

where $\xi$ is a largest ignorable distance in visual psuchology and d(i,j) denotes a Euclidean distance between i and j which are two boundary points of a shape.

3. The method of claim 1, wherein the global features are extracted as:

$$h(k) = \sum_{i=1}^{n}\sum_{j=i+1}^{n} \theta(i,j), \quad \text{if } L(k) \leq \theta(i,j) < U(k)$$

$$\theta(i,j) = \frac{d^*(i,j)}{d(i,j)}$$

where n is a number of boundary points of a shape, L(k) and U(k) are the lower bound and upper bound of a $k^{th}$ bin of a histogram.

4. The method of claim 1, wherein the local features of a shape are extracted using a scale-invariant feature transform (SIFT) algorithm.

5. The method of claim 1, wherein the step S5 comprises:
    computing a matching score of global features; and
    using a reciprocal of the matching score of the global features as the weight value of the local features.

6. The method of claim 5, wherein a final matching score between two shapes is defined as:

$$dis_{final} = dis_{global} + \alpha \times dis_{local}$$

where $dis_{global}$ is a global histogram distance between two shapes which indicates the degree of global matching, $dis_{local}$ is a local histogram distance between two shapes which indicates a degree of local matching and $\alpha$ is the weight value of the local features and is proportional to $dis_{global}$.

7. The method of claim 1, wherein the step S6 comprises:
    assembling the shapes from a same category; and
    separating the shapes from different categories.

* * * * *